Nov. 28, 1939.      F. M. GUY      2,181,183
FLEXIBLE COUPLING
Original Filed Nov. 29, 1935     2 Sheets-Sheet 1
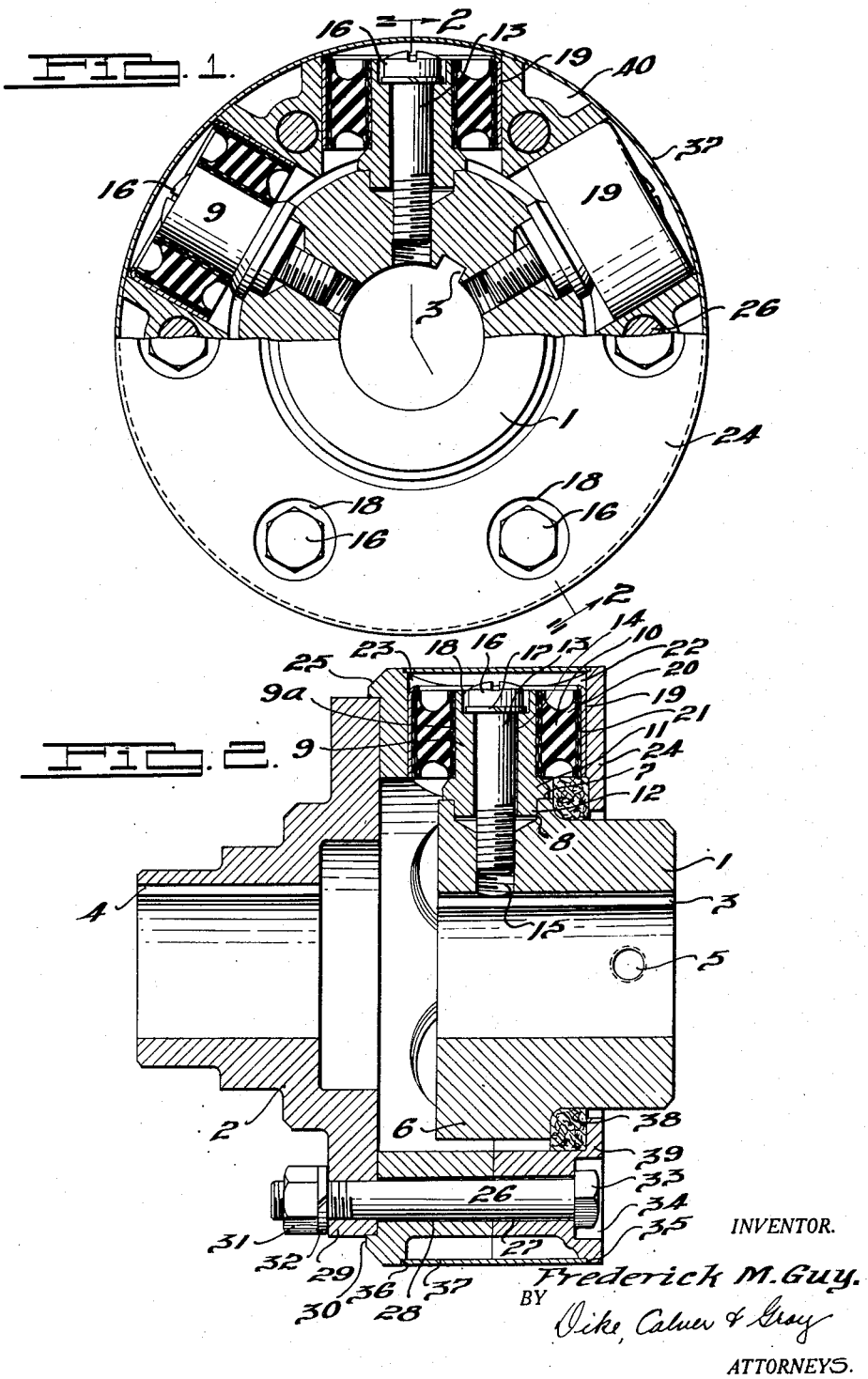
INVENTOR.
Frederick M. Guy.
BY
Dike, Calver & Gray
ATTORNEYS.

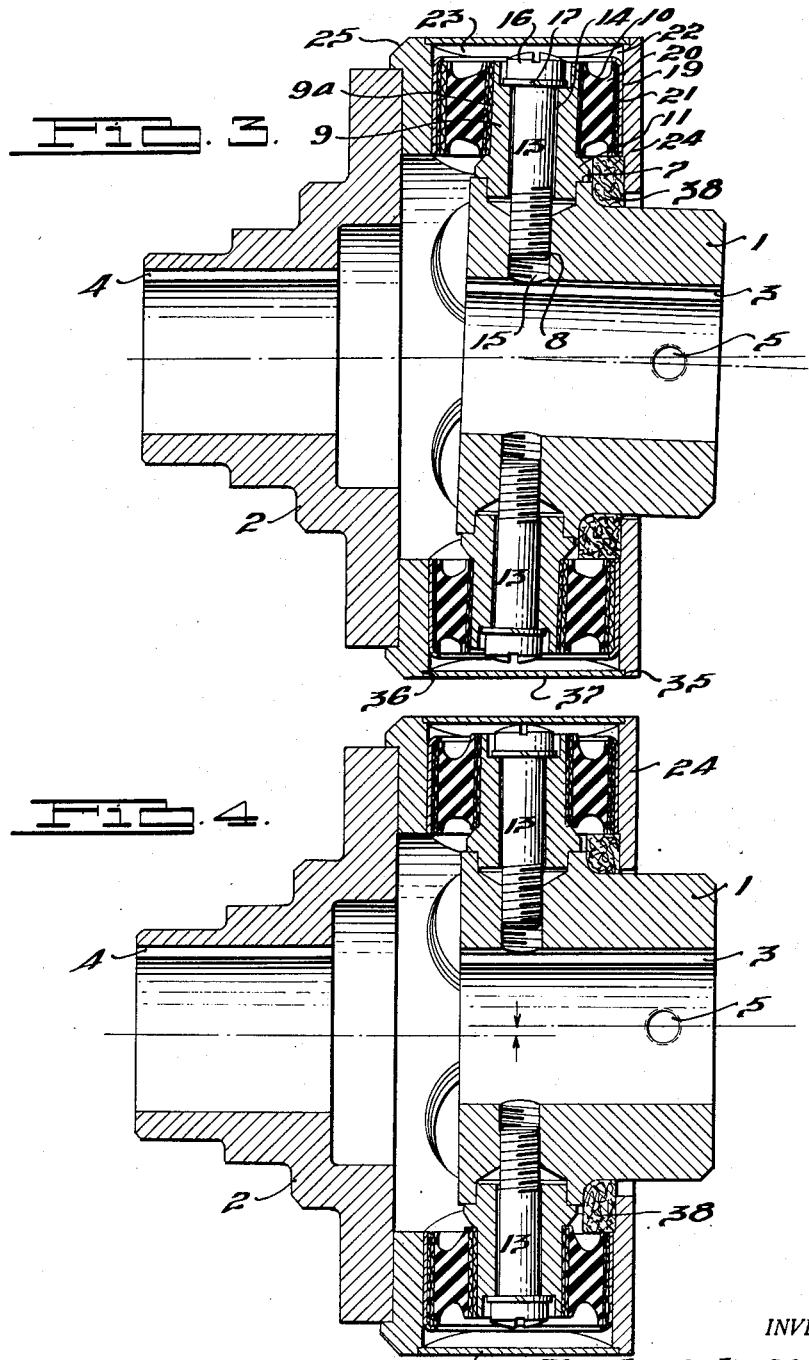

Patented Nov. 28, 1939

2,181,183

UNITED STATES PATENT OFFICE 2,181,183

FLEXIBLE COUPLING

Frederick M. Guy, Detroit, Mich., assignor to Guy and Murton, Incorporated, Detroit, Mich., a corporation of Michigan Continuation of application Serial No. 52,035, November 29, 1935. This application September 29, 1938, Serial No. 232,380

11 Claims. (Cl. 64—11)

This invention relates to flexible couplings and more particularly to flexible couplings which are adapted particularly but not exclusively to be connected with the propeller shaft of a power-driven boat and to compensate for misalignments between the propeller shaft and the power-driven shaft. The invention is likewise applicable to any joint or coupling where the joint or coupling is required to accommodate both torque and thrust without causing excessive wear on the bearings or other connected parts of the driving and driven shafts.

The present application is a continuation of my co-pending application, Serial No. 52,035, filed November 29, 1935.

The present invention provides a resilient coupling by means of which two shafts, which are not in alignment, can be coupled so that both torque and thrust can be transmitted from one shaft to the other through a cushion of resilient rubber. A coupling of this character is especially, but not exclusively, useful in installing the propeller shafts and engines of motor boats. When the engine of the motor boat is placed on its bed, it is difficult to get it exactly in line with the propeller shaft. It is conventional practice to mount the motor on engine mountings, usually of a resilient type, which permits a floating mounting of the engine in the hull. Even if perfect alignment is secured when the engine is installed, the hogging, sagging, or other change in the shape of the hull of the boat, which almost invariably takes place as the boat gets old, throws the shaft out of line. Even when the boat is new, the working of the vessel in a seaway causes momentary misalignment of the engine and shaft. The misalignment, which thus invariably takes place, unnecessarily stresses the propeller shaft and the shaft of the reverse gear to which it is fastened and throws an increased load on the bearings of the reverse gear and the propeller shaft or stuffing box bearings. In addition, the use of resilient engine mountings, permitting movement of the engine relative to the mounting, creates a condition wherein the driving shaft is constantly out of any set or fixed alignment and this condition is accommodated by the construction herein disclosed.

Heretofore attempts have been made to obviate these difficulties by placing a universal joint in the propeller shaft or between the propeller shaft and the reverse gear. These attempts, unless thrust bearings on the propeller shaft were also added, only resulted in further trouble, because such universal joints as have been commercially available cannot satisfactorily transmit both torque and thrust loads. Particularly in marine construction, the thrust of the propeller which was transmitted from the propeller shaft through the universal joint caused a rapid wear in the joint and required the use of special types of thrust bearings.

A principal object of the present invention is to provide a universal joint or flexible coupling which satisfactorily transmits both torque loads and thrust loads without requiring specially constructed thrust bearings. This result has been accomplished by providing a flexible coupling having resilient connecting means which can transmit forces parallel or angular to the shafts as well as they can transmit forces in a plane perpendicular thereto.

It is a further object of the present invention to provide a fully enclosed flexible coupling in which the working parts are protected from dirt, grease, gasoline and oil, and which has a plurality of similar parts in order to lessen the cost of manufacture.

It is a further object of the present invention to provide a flexible coupling whose resilient members can be easily installed, removed or replaced.

It is another object of the present invention to provide a flexible or resilient universal joint in which a plurality of resilient power-transmitting cushion members are disposed radially of the connected shafts to accommodate misalignments of the shafts through distortion of the resilient members, which distortion is accompanied by both a compression and a stretching of the resilient medium which acts on the connected parts to restrain the misalignment thereof and to return the parts to a normal aligned position under load condition permitting such return.

It is a further object of the present invention to provide a flexible or resilient universal joint construction in which the load-carrying and power-transmitting resilient members are all carried by members attached to one connected shaft and the connections therewith are carried by the other connected shaft, thereby permitting maximum torque capacity within predetermined dimensional limits.

Other objects of this invention will appear in the following description and appended claims, reference being had to the accompanying drawings forming a part of this specification wherein like reference characters designate corresponding parts in the several views.

Fig. 1 is an elevation of one end of the flexible coupling with the upper part of the housing and flanges broken away to show the interior construction.

Fig. 2 is a section taken substantially on the line 2—2 of Fig. 1 in the direction of the arrows.

Fig. 3 is an axial section through the coupling taken when it is connecting two shafts whose longitudinal axes are angularly misaligned.

Fig. 4 is an axial section through the coupling taken when it is connecting two shafts whose longitudinal axes are in parallel misalignment.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirement of the prior art.

The coupling shown by way of example as embodying the present invention and which is adapted to join together two shafts which are in approximate alignment, comprises two collars 1 and 2, adapted to be secured to the adjacent ends of the driving and driven shafts. The collars 1 and 2 are connected to each other through resilient members which can be distorted to accommodate misalignments of the said shafts and to absorb both torque and end thrusts.

The collars 1 and 2 are secured to the ends of the connected shafts and are locked thereon by means of keys (not shown) fitting into the keyways 3 and 4 provided in the collars 1 and 2, and by set screws (not shown) fitted into the tapped openings 5. The collar 1 is provided with a low thick flange 6 at the end near the collar 2. The periphery of this flange 6 has a plurality of flat areas 7 spaced evenly around it, and in the center of each of these flat areas there is a counter-bore 8 which extends radially into the flange and the collar, forming, with the flat area, a seat for a stud 9 which is connected with one of the resilient bushings 10 through which the other shaft is flexibly driven.

The core 9 of each of the bushings 10 is a generally cylindrical rigid member having a formed end which fits into one of the counter-bores 8, and a collar 11 which fits against the corresponding flat area 7 on the rim of the flange 6. The bushing 10 is held in place on the collar 1 by a bolt 13 which extends through a central hole 14 in the studs 9 into a tapped hole 15 at the bottom of the counter-bore 8.

The head 16 of the bolt and the lock washer 17 under it, fit into a counter-bore 18 in the outer end of the studs 9. The cylindrical shell 19 of the bushing is concentric with and radially spaced from the core 9. The cylindrical shell 19 permits compression of the resilient members prior to assembly of the joint and may be omitted if desired. The annular space between the core 9 and the shell 19 is partially filled by a body of resilient rubber 20 which is securely bonded to the outer surface of a flexible bushing 9a surrounding the core 9 and the inside of a concentrically disposed flexible shell 21. The bushing 9a and the shell 21 are formed of fabric, wire mesh, or other perforate materials, yieldingly maintained in place by resilient rubber bonding resulting from the flow of rubber through the perforate materials during the manufacture of the bushing. The details of construction of such bushings are shown in my United States Letters Patent No. 1,978,940 and reference may be had thereto for other structural features of such members.

The resilient members are maintained in place on the studs 9 by the compression of its rubber 20 and the friction between the studs 9 and the core 9a which is forced over the studs 9. The flexibility of the core 9a permits this to be done, which places the rubber under a slight and controllable amount of initial compression so that working begins from the compression rather than the tension phase of the rubber.

A plurality of bushings, in this instance six, fit into a corresponding number of radial holes formed by complementary semi-cylindrical radial recesses 22 and 23 in the abutting surfaces of two rings 24 and 25. These rings are secured together and to the collar 2 by means of a plurality of bolts 26 which extend through holes 27 and 28 parallel to the common axis of the rings and through holes in a flange 29 on the end of the collar 2 near the other collar 1. A slight clearance around the bolts 26 is provided in the holes 27 and 28 to facilitate assembly, but accurate positioning of the two rings with respect to each other is insured by the bushing shells in the complementary recesses, and accurate positioning of the rings with respect to the flange 29 is insured by a cylindrical flange 30 which fits over the rim of the flange 29.

By the construction herein provided, the joint is essentially of balanced construction and so is seldom caused to run out of line due to its structure. Resilient joints heretofore proposed have utilized bushings in which the rubber or other resilient material is forced, under a high degree of compression, between an inner core and an outer shell, both formed of rigid materials. Because of variations in the resilient material, it is not possible to insure an even distribution of the resilient materials between the core and the shell with the result that any parts connected thereto are thrown out of alignment immediately upon the assembly of the parts in a universal joint. The resilient members herein proposed, while possessing a greater degree of resiliency than the construction just described, also have the advantage of permitting accurate placement of the cores and shells during the manufacture thereof and the substantially uniform placement of the resilient material therebetween.

Nuts 31 and lock washers 32 on the bolts 26 keep the rings 24, 25 clamped tightly together against the flange 29 with the resilient bushings 10 between them. The heads 33 of the bolts 26 fit into recesses 34 in the side of the ring 24 so that there are no projections outside of the coupling.

Oppositely facing opposed shoulders 35 and 36 extend around the periphery of the rings 24 and 25 on each side of the semi-cylindrical recesses which receive the bushings 10. A cylindrical sleeve 37 surrounds the rings 24 and 25 and is clamped axially between opposed shoulders 35 and 36 to protect the outer ends of the bushing from water, dirt, grease and oil. A resilient felt ring 38 seals the space between the flange 6 and an inwardly directed flange 39 on the inside of the ring 24 of the collar 1. The rings 24 and 25 have recesses 40 between the bushing 10 and above the bolts 26 to lessen their weight.

While I have described and shown only one preferred or commercial embodiment of my invention, I do not intend that the scope of the monopoly granted to me by this patent should be restricted to such particular features of construction as here shown, as obviously many changes can be made without departing from the spirit of the invention. For example, various metal parts shown as separate parts, can be made as a single part. A low price joint, for example, might be made in which all of the metallic parts fastened to each shaft might be made of one or two pieces of metal with the resilient members disposed directly therebetween.

As examples of resilient materials which may be used, either rubber or substitutes therefor, such as balata, "Duprene," or other synthetic rubber or rubber-like substances, may be used. In other types of constructions, resilient members such as steel springs or the like may be used. In view of the progress which has been made in recent years in the development of synthetic rubber-like compounds, the term rubber as used herein is intended to include synthetic as well as natural rubber, or any other plastic body having the desired degree of resiliency.

A flexible coupling or universal joint of the present invention will accommodate angular, parallel or longitudinal misalignments of the connected shafts by movement of the connected parts transmitted to the resilient bushing members. The resiliency of the bushing members is depended upon in the present construction both to absorb loads imposed thereon and to restore the parts to the positions occupied under normal load conditions. In taking torque or end thrust (longitudinal misalignment), the rubber in the bushings is distorted by compression forces imposed thereon on the load side, and is stretched on the opposite side by the movement of the connected parts away from the normal position as shown in Figs. 1 and 2. If the driving and driven shafts are thrown into a condition of angular misalignment as shown in Fig. 3, the movement is transmitted through the studs 9 and the connected members to the resilient bushings and the cores 9a thereof are moved relative to the shell 21 in such a manner as to set up a distortion due both to compression on the rubber and to corresponding stretching in the rubber 20 because of the angular movement of the core. At the same time, the core 9a is caused to move along its longitudinal axis and this movement causes a working of all the rubber in all the bushings in the joint. This latter condition is more definitely shown in Fig. 4, which represents the action of the parts when the connected shafts are thrown into parallel misalignment. As there shown, the movement of the shafts is transmitted to the joint or coupling and is accommodated by the longitudinal movement of the cores 9a relative to the shells 21. In each instance, the movement of the core 9a relative to the shell 21 is yieldingly resisted by the rubber, either by the stretching of the rubber or by distortion due to compression forces imposed on the resilient member. Thus at all times movements of connected parts are resisted by the distortion set up in the resilient blocks. The energy required to cause the distortion is in effect "stored" in the distorted resilient members which, upon release of the forces, deliver the "stored" energy into the system and return the parts to the positions they are intended to occupy under normal load conditions.

While the construction herein disclosed provides a satisfactory type of joint, it is desirable for certain purposes to modify the construction by rigidly securing the studs 9 to the collar 1 as by welding or the like. Such studs may be provided with either a threaded or tapped projecting end which will engage a nut or screw which may assist in holding the resilient member in place thereon. It is not necessary to provide the nut or screw in all constructions, as for most purposes the pressed fitting of the resilient member on the studs 9 will be sufficient to accommodate all strains imposed thereon.

In the construction here shown, the resilient members and the carrier therefor are carried on the driven shaft, while the studs 9 are carried by a projection outwardly from the driving shaft. It is within the purview of the present invention to reverse this arrangement and carry the studs on the driven shaft either projecting outwardly therefrom or inwardly from a collar carried by said shaft.

I claim:

1. A flexible coupling comprising an annular carrier having a plurality of radial pockets substantially equally disposed circumferentially thereof, each of said pockets having an open end, a detachable circumferential ring secured on the periphery of said carrier to close the open ends of each of said pockets and to form an outwardly extending arcuate end thereof, a plurality of substantially cylindrical rubber bushings mounted one in each of said pockets and in contact with a portion of said detachable ring at points on the periphery of the said bushing, thereby spacing the central portion of each of said bushings from contact with the outwardly extending arcuate end of the pocket formed by said detachable ring whereby longitudinal movement of the central portions of said bushings relative to said carrier is permitted, a reinforcing sleeve secured centrally of each of said bushings and movable bodily relative to said bushing, a hub disposed concentrically within said annular carrier and spaced for movement relative thereto, and a plurality of driving connections positively connected to said reinforcing sleeves and said hub whereby the hub and carrier are yieldably connected for a universal resilient movement which is accommodated by distortion occurring simultaneously in all of said resilient bushings.

2. A flexible coupling comprising an annular carrier having a plurality of radial pockets substantially equally disposed circumferentially thereof, each of said pockets having an open end, a detachable circumferential ring secured on the periphery of said carrier to close the open ends of each of said pockets and to form an outwardly extending arcuate end therein, a plurality of substantially cylindrical rubber bushings mounted one in each of said pockets and in contact with a portion of said detachable ring at opposed sides of the periphery of each of said bushings, thereby spacing the central portion of each of said bushings from contact with the outwardly extending arcuate end of the pocket formed by said detachable ring whereby longitudinal movement of the central portions of said bushings relative to said carrier is permitted, a reinforcing sleeve secured centrally of each of said bushings and movable bodily relative to said bushing, a hub disposed concentrically within said annular carrier and spaced for movement relative thereto, a plurality of radial studs secured to said hub and affixed one each to the core of each of said bushings, a shoulder on each stud adapted to contact an end of the core of the resilient bushing connected to said stud and arranged to maintain the end of said bushing in spaced relation to said hub, whereby the cores of all of said bushings are spaced from said hub and from the bottom of the pockets in said carrier to permit simultaneous yielding movement of the cores in all directions to accommodate relative movements of the shafts connected respectively to said carrier and said hub.

3. A flexible coupling of the resilient type comprising a resiliently mounted floating hub yieldably maintained within an annular carrier having a plurality of open pockets substantially equally spaced about the periphery thereof and lying in planes extending substantially at right angles to the center line of said hub, a resilient bushing secured in each of said pockets and comprising a spaced reinforcing core and shell secured to a resilient rubber body portion and resiliently movable as a unit relative to each other, a circumferential band extending about the periphery of said carrier and enclosing the ends of said pockets to provide an outwardly extending arcuate end closure for each of said pockets and adapted to contact a portion of the outer shell of each of said bushings to permit the cores of said bushings to be displaced outwardly into the enclosed end portion of said pockets, a plurality of radially extending studs positively connected to said hub and to the reinforcing core of each of said resilient bushings whereby all relative movement of the hub and carrier is accommodated by simultaneous distortion of the resilient bushings and movement of the cores of each of said bushings relative to said carrier.

4. A flexible coupling adapted to connect a driving shaft and a driven shaft and comprising an annular carrier adapted to be secured to one of said shafts and having a plurality of cylindrical pockets substantially equally spaced circumferentially thereof, a hub adapted to be secured to the other of said shafts and disposed concentrically in the annulus of said carrier and spaced for movement relative thereto, a plurality of resilient bushings secured within said pockets in said carrier, each of said bushings comprising a substantially imcompressible core disposed concentrically within a substantially incompressible shell and having a body of resilient rubber bonded to said core and shell whereby said core and shell may be resiliently displaced as a unit relative to each other, a plurality of radial studs secured to said hub and affixed one each to the core of each of said bushings, a shoulder on each stud adapted to contact an end of the core of the resilient bushing connected to said stud and arranged to maintain the end of said bushing in spaced relation to said hub, whereby simultaneous yielding movement of the cores in all directions is permitted to accommodate relative movements of the shafts connected respectively to said carrier and said hub.

5. A flexible coupling adapted to connect a driving shaft and a driven shaft and comprising a hub, a collar concentric with said hub and spaced therefrom, said hub and collar being adapted for connection one to the driving and the other to the driven shaft, said spaced collar having a multiplicity of radial pockets therein, studs secured to said hub and extending radially thereof and into said pockets, a resilient bushing disposed about each of said studs and maintained within said pockets by positive connection with a surface of the studs and with the walls of the pockets, and means carried by each of said studs for circumferentially supporting said bushings centrally of their inner ends with the remainder of the inner end areas free from contact with said hub and the opposite ends of the bushing being substantially free from contact with said collar, thereby to permit a resiliently opposed radial displacement of said hub relative to said collar by simultaneous elongation of the resilient element of each of said bushings.

6. A flexible coupling adapted to connect a driving shaft and a driven shaft and comprising collars for connection to said shafts, one of said collars having a multiplicity of radially spaced recesses therein, studs extending into and radially outward from said recesses, inter-engaging means on the studs and the walls of the recesses, means for connecting the studs in said recesses in inter-engaged relation with the walls thereof, a housing member connected to the other collar and having a multiplicity of radial pockets into which said studs extend, bushings disposed about said studs and within said pockets, said bushings being connected to the walls of the studs and the walls of the pockets and each comprising a rubber core concentric with the stud and flexible facings respectively resiliently pressed radially by said core against the wall of the stud and the wall of the pocket, one of said inter-engaging means forming a circumferential support for each bushing at one end thereof with the remainder of the end area of the bushing at that end free and the opposite end areas of the bushings being substantially entirely free, thereby to permit a resiliently opposed radial displacement of said hub relative to said collar by simultaneous elongation of the resilient element of each of said bushings.

7. A flexible coupling adapted to connect a driving shaft and a driven shaft comprising collars respectively for connection to said shafts, one of said collars having a multiplicity of radially spaced recesses therein, studs extending into and radially outward from said recesses, a housing member connected to the other collar and having a multiplicity of radial pockets into which said studs extend, bushings disposed about said studs within said pockets, said bushings connected to the walls of the studs and the walls of the pockets, and each comprising a rubber core concentric with the stud and flexible facings respectively resiliently pressed radially by said rubber core against the wall of the stud and the wall of the pocket, and means for circumferentially supporting said bushings at their inner ends with the remainder of the inner end areas free and the opposite ends of the bushing being substantially entirely free, said housing and the collar to which it is connected being inter-engaged and locked in such inter-engaged relation.

8. A flexible coupling in accordance with claim 5 in which the parts are sealed in an enclosed casing.

9. In a universal joint, a plurality of resilient bushings each comprising a flexible radially extending cylindrical core, a layer of rubber encircling the core and secured thereto, a flexible cylindrical shell secured to the outer circumference of the rubber, a detachable stud positively connected with the core of each bushing and removably connected with a central hub connected with a shaft having a longitudinal axis extending substantially at right angles to each of said studs, and a collar concentric with said hub and secured to another shaft and having a plurality of spaced radial pockets therein each adapted to receive one of said resilient bushings and the stud connected therewith, said stud and the said pockets in said collar being arranged to maintain each of said resilient bushings in spaced relation to said hub and said collar to permit relative movements of said connected shafts to be accommodated solely by the simultaneous distortion of the rubber layer of each bushing, each of which permits a relatively large amount of angular and parallel movement of the connected shafts while resiliently opposing a like amount of relative endwise movement of the connected shafts.

10. A flexible coupling in accordance with claim 6 in which the parts are sealed in an enclosed casing.

11. A flexible coupling adapted to connect a driving shaft and a driven shaft and comprising collars for connection to said shafts, one of said collars having a multiplicity of radially spaced recesses therein, studs extending into and radially outward from said recesses, inter-engaging means on the studs and the walls of the recesses, means for connecting the studs in said recesses in inter-engaged relation with the walls thereof, a housing member connected to the other collar and having a multiplicity of radial pockets into which said studs extend, bushings disposed about said studs and within said pockets, said bushings being connected to the walls of the studs and the walls of the pockets and each comprising a rubber core and flexible facings respectively resiliently pressed radially by said core against the wall of the stud and the wall of the pocket, one of said inter-engaging means forming a circumferential support for each bushing at one end thereof with the remainder of the end area of the bushing at that end free and the opposite end areas of the bushings being substantially entirely free, thereby to permit a resiliently opposed radial displacement of said hub relative to said collar by simultaneous elongation of the resilient element of each of said bushings.

FREDERICK M. GUY.